United States Patent [19]

Herchenbach

[11] 4,363,668

[45] Dec. 14, 1982

[54] METHOD AND APPARATUS FOR BURNING RAW MATERIALS

[75] Inventor: Horst Herchenbach, Troisdorf, Fed. Rep. of Germany

[73] Assignee: Klöckner-Humboldt-Deutz AG, Fed. Rep. of Germany

[21] Appl. No.: 179,161

[22] Filed: Aug. 18, 1980
(Under 37 CFR 1.47)

[30] Foreign Application Priority Data

Aug. 17, 1979 [DE] Fed. Rep. of Germany ....... 2933289

[51] Int. Cl.³ .......................... C04B 7/02; F27B 15/00; F27B 7/02
[52] U.S. Cl. ..................................... 106/100; 432/14; 432/106
[58] Field of Search .................. 432/14, 15, 18, 106, 432/163, 164; 106/100

[56] References Cited

U.S. PATENT DOCUMENTS

| | | | |
|---|---|---|---|
| 1,521,129 | 12/1924 | Ronne | 432/14 |
| 2,823,910 | 2/1958 | Ravasio | 432/106 |
| 4,004,876 | 1/1977 | Sylvest | 432/14 |
| 4,130,390 | 12/1978 | Kobayashi et al. | 432/14 |
| 4,168,951 | 9/1979 | Drugge | 432/14 |

*Primary Examiner*—John J. Camby
*Attorney, Agent, or Firm*—Hill, Van Santen, Steadman, Chiara & Simpson

[57] ABSTRACT

Method and apparatus for burning raw materials in the production of clinker from cement raw materials in which a portion of the cement raw materials are dried and partially deacidified under conditions which produce granules, while another portion of the raw materials in the form of finely divided meal is heat treated in a suspension type heat exchanger, and at least partly deacidified in a calciner forming part of the heat exchanger. The thus treated granules and meal are then mixed together and the mixture is treated in a thermal reactor such as a rotary kiln to complete deacidification and to cause the formation of the cement clinker.

10 Claims, 1 Drawing Figure

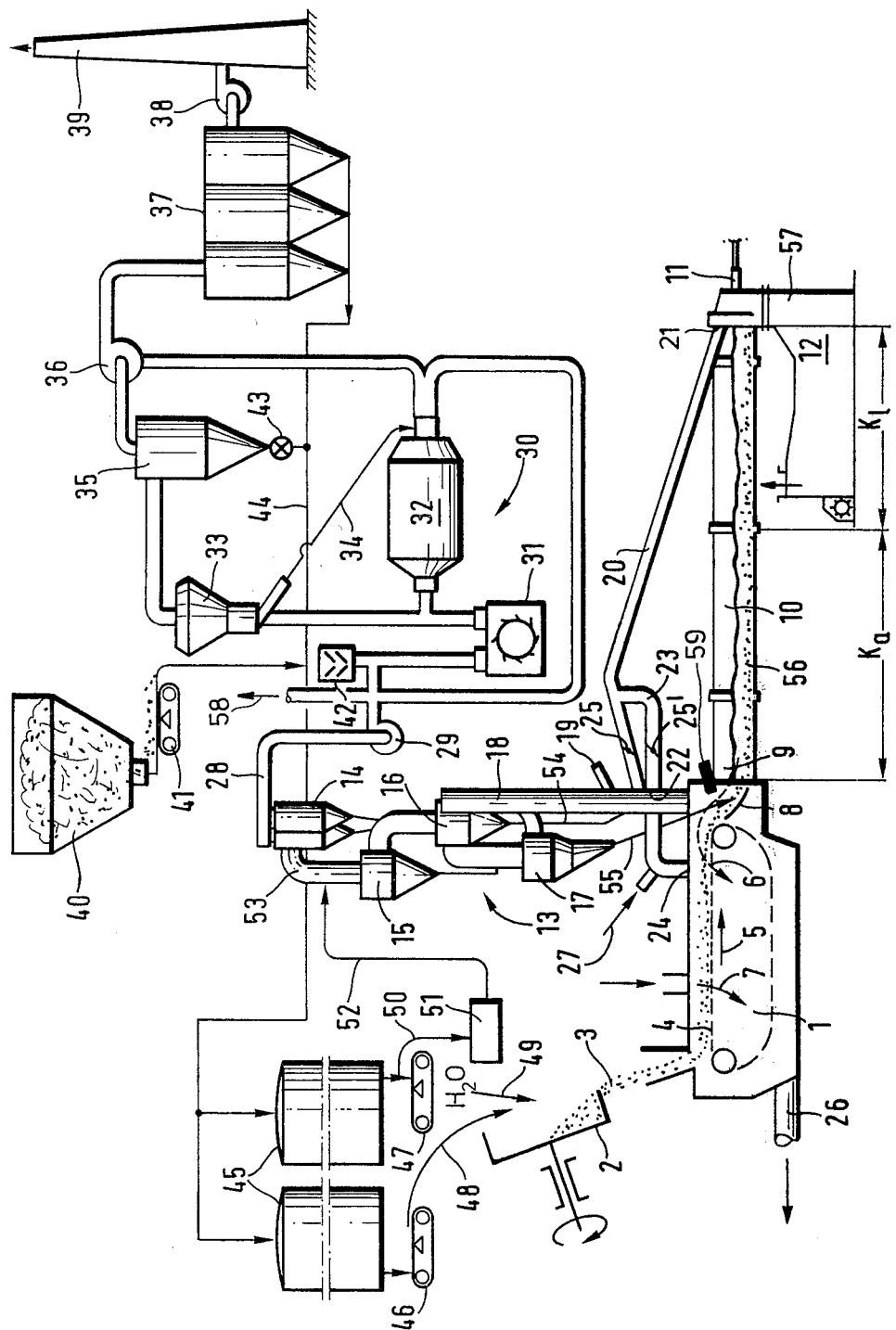

METHOD AND APPARATUS FOR BURNING RAW MATERIALS

BACKGROUND OF THE INVENTION

1. Field of the Invention

This invention is in the field of a method and apparatus for producing cement clinker wherein one part of the cement raw material is treated under conditions to form granules and the other is ground and heat treated in a suspension type heat exchanger to form at least partially deacidified meal, and the granules and meal are combined in the final sintering step in a rotary kiln or the like.

2. Description of the Prior Art

Some cement making installations have made use of the combination of a traveling grate which is subjected to treatment by hot gases, in combination with a sintering kiln and a cooler beyond the kiln. Methods and apparatus of this type are described, for example, in the publication of Duda "Cement-Data-Book", Internationale Verfahrenstechniken der Zement-industrie, Second Edition, Wiesbaden, Berlin, Bauverlag, ISBN 3-7625-0834-8, 1977, pages 375 through 378. In systems described in this publication, the heat consumption required amounts to between 1,000 and 800 kcal/kg of clinker.

SUMMARY OF THE INVENTION

The present invention provides a method and apparatus capable of being used with existing clinker manufacturing facilities which permits an integrated new method and apparatus for increasing the production capacity of a given plant. The specific consumption of thermal energy per kg of clinker, including raw material drying, is lowered insofar as possible overall. The desired result is obtained with minimal amounts of capital costs and assembly work. The improvements of the present invention can be incorporated into existing plants without a long interruption of production of the existing system. Finally, the present invention makes possible the most efficient utilization of construction space.

In accordance with the present invention, a portion of the cement raw material is supplied as a raw meal to a suspension type heat exchanger, is heated, and at least partially deacidified therein and thereupon combined with granules of the cement raw material to form a mixture which is completely deacidified in a thermal reactor and is there finish-burned into clinker. The new process and apparatus provides the surprising advantage that the heat transmission from the hot burnable gas to the mixture consisting of granules and meal is significantly better than between gas and the granules alone. As a result, the following advantages are achieved with the process of the present invention:

1. Production increases up to 100%;
2. A greater possible retention of existing system parts;
3. A low specific capital cost for the added new construction;
4. A low moisture content in the raw meal in comparison to green granules, as well as reduced specific radiation losses of the burning system thereby reducing the specific heat consumption of the process;
5. Elimination of agglomeration outlay in the raw meal;
6. With a moisture content up to approximately 8%, the drying of the raw meal can be carried out without additional firing by means of the heat content contained in the exhaust gases from the heat exchanger and the cooler exhaust gas. As a result, there is a further reduction in the specific heat outlay in the overall process, including grinding and drying.

The additional system requires low additional space requirements.

BRIEF DESCRIPTION OF THE DRAWINGS

The single FIGURE in the drawings illustrates a sample embodiment of an integrated burning system employing the improvements of the present invention.

DESCRIPTION OF THE PREFERRED EMBODIMENTS

In a preferred form of the present invention, the mixture going to the thermal reactor contains granules having an average degree of deacidification ranging between 0 and 60%, together with a meal having a degree of deacidification averaging between 30 and 95%. In the preferred form of the invention, the mixture is combined when the granules have a temperature between 300° and 700° C. and the meal has a temperature between 700° and 980° C. Due to the high degree of deacidification as well as the high temperature of the meal in comparison to the granules, there is the advantage that the required heat outlay in the thermal reactor, such as the rotary tubular kiln, is kept within the limits permitted for the complete deacidification of the mixture as well as in the finish-burning of the mixture into clinker. To further improve on this advantage, the granules may be further treated to achieve a higher temperature or a greater degree of deacidification by introducing additional amounts of thermal energy under the granules as they travel on the traveling grate toward the thermal reactor.

In a further embodiment of the invention, additional amounts of fuel may be added to the mixture, particularly at or before the time of its entry into the thermal reactor. This feature has the advantage that the added fuel supplies a component of the heat requirement in the calcination in the thermal reactor, and thereby reduces the thermal load of the sintering zone. The fuel is preferably added in the form of lumps.

The apparatus of the present invention makes use of a traveling grate which is subjected to the flow of hot gases, a sintering kiln which receives the discharge from the traveling grate, and a cooler which is connected beyond the sintering kiln. The apparatus also includes a suspension type heat exchanger equipped with a calciner and means for a secondary firing in the calciner. These are arranged above the intake of the sintering kiln and are connected in parallel with respect to the material flowing through on the traveling grate. Although it is known, per se, to provide a suspension type heat exchanger above the intake to the sintering kiln in a system for burning raw materials (as shown in German AS No. 26 57 621), this prior art suspension type heat exchanger is connected to the traveling grate with respect to the passage of material. Furthermore, it contains no calciner and no secondary firing.

In the apparatus of the present invention, the suspension type heat exchanger is connected in parallel with respect to the material flow on the traveling grate, so that it has the advantage that an additional load on the traveling grate by the additional material in the overall system is avoided.

Since the traveling grate can be charged with only lumpy material, for example pellets, the outlay for agglomeration of raw meal is substantially eliminated. In addition, the amount of binding water required for agglomeration to form the pellets can amount up to 15% by weight, and this large amount of water can be reduced. The additional outlay for thermal energy which would be required in order to dry the granules before the actual burning operation is also avoided in the system of this invention.

Another feature of the invention resides in providing a tertiary air conduit parallel to the sintering kiln and leading from the cooler to the suspension type heat exchanger and, more particularly, to the zone of secondary firing in the calciner. Because of this tertiary air conduit, the sintering kiln which is usually a rotary tubular kiln is freed from this increased gas throughput. In a still further embodiment, a branch line is connected to the tertiary air conduit and discharges into the traveling grate. This branch line serves to provide some of the increased requirement of hot combustion air in the traveling grate and may further be used in connection with an auxiliary burner which is disposed in the area near or at the discharge end of the traveling grate.

Turning now to the drawings, the burning system of the present invention includes a traveling grate 1 which is supplied with granules 3 from a pelletization plate 2. The layer of granules moves with a continuous grate chain 4 in the direction of the arrow 5 and is contacted by hot gas as schematically illustrated by the arrows 6 and 7. As the temperature of the granules increases, they are first dried, then pre-burned, and then may be partly calcined. The thermally treated granules roll off from the traveling chain 4 and pass through a chute 8 into the intake area 9 of a rotary tubular kiln 10. The rotary tubular kiln 10 connects with a clinker cooler 12 at the side of the kiln burner 11. A suspension type heat exchanger generally indicated at reference numeral 13 is arranged above the intake area 9 of the rotary tubular kiln 10 and is connected in parallel to the traveling grate 1 with respect to the material passage. This suspension type heat exchanger 13 may consist of four stages 14, 15, 16, and 17 and is additionally equipped with a calciner in the form of a reaction section 18 provided with a secondary firing stage 19. A tertiary air conduit 20 is connected to the cooler at a junction 21 and discharges into the calciner 18 at a junction 22, thereby being in parallel with the rotary tubular kiln 10. A line 23 branches off from the tertiary air conduit 20 and discharges into the traveling grate 1 at a junction 24. Control baffles 25, 25' are arranged both in the tertiary air conduit 20 as well as in the branch line 23. The traveling grate 1 is further equipped with an exhaust gas outlet nozzle 26. In addition, there may be provided an auxiliary burner directed at the granules on the chain 4, as illustrated by the arrow 27.

Exhaust gas is supplied from the highest part of the suspension type heat exchanger 13 through a line 28 and a blower 29 to a raw material grinding system indicated generally at reference numeral 30. This system includes a hammermill 31, a tube mill 32, a sifter 33 with a particle return line 34, a separator 35, an exhaust blower 36, an air filter 37, an exhaust blower 38, and a chimney 39. The raw material to be ground is withdrawn from a homogenizing silo 40 by means of a gravimetrically metering distribution system 41 and is supplied to the hammermill 31 through a pair of double flap valves 42. The finished ground meal is withdrawn from the separator 35 by means of a star wheel 43 and is transported by means of a line 44 into a battery of raw meal homogenizing silos 45, together with the fine material recovered in filter 37. Raw meal is withdrawn from the silos 45 by means of gravimetrically metering distribution elements 46 and 47 and is supplied as indicated by the arrow 48 to the pelletizing plate together with added binding water distributed in metered amounts as shown by arrow 49. Raw meal withdrawn with the metering device 47, on the other hand, as indicated by the arrow 50, is supplied to a line 52 by means of a transport device such as a Fuller pump 51 into a gas line 53 leading from the heat exchanger cyclone 15 into the heat exchanger cyclone 14.

In the event the original system to be modified had a traveling grate, rotary tubular kiln, and clinker cooler together with a separate hot gas generator, these items could be continued to be employed without the hot gas generator since the hot gas is supplied to the grinding-drying system from the heat exchanger 13 by means of the connection line 58. The grinding-drying system 30 is designed only for the comminution of the raw meal requirements supplied from the additional heat exchanger 13.

In the heat exchanger 13, the raw meal is conveyed downwardly under constant heating from stage to stage in the usual manner, and is thereby at least partially calcined. From the third cyclone 16, the heated and at least partially calcined raw meal is introduced through a line 54 into a reaction section 18 of the calciner where it is admixed with fuel from the secondary firing stage 19 as well as with hot cooler exhaust air from the tertiary air conduit 20. The meal is then subjected to a spontaneous calcination reaction and, after another heat exchange in the cyclone 17, is conducted through a liner 55 toward the intake chute 8 into the intake area 9 of the rotary tubular kiln 10 where the calcined fine material forms an intimate mixture with the granules being delivered by means of the traveling grate chain 4.

A device for adding additional fuel, such as fuel in the form of lumps, is provided at reference numeral 59. This additional fuel can be inferior coal, refuse such as automobile tire scraps, domestic refuse, or other combustible materials.

The contents 56 of the rotary tubular kiln 10 consisting of the mixture of granules and meal and, under some conditions, additional fuel first passes through the calcining zone "Ka" and subsequently through the clinker zone "Kl" of the rotary tubular kiln 10. The finish-burned clinker is discharged through a stack 57 into the clinker cooler 12 and is cooled in the cooler in the conventional manner.

The invention is not limited solely to the embodiment shown in the drawings. The essential part of the invention is the parallel arrangement of the traveling grate 1 and the suspension type heat exchanger 13 with relation to the material flow. The type and arrangement of these various elements, however, can be varied. Thus, for example, the traveling grate 1 can be designed as a single or a multistream system. The post-connected rotary tubular kiln can be one of the so-called short rotary kilns. The cooler 12 can correspond to any known cooler whether it be a clinker grate cooler, a tube radiator, a satellite cooler, or some other device.

The suspension type heat exchanger 13 can be equipped with four stages or with some other number of stages. It can also be equipped with two parallel raw meal pre-heater lines and also contain a pre-calciner. A moving-bed reactor can be also be employed as the calciner. A cyclone dust remover can be used, for example, in the tertiary air conduit and finally, the suspension type heat exchanger can also be in the form of a shaft-like countercurrent heat exchanger which is likewise known per se. The raw material grinding system is representative of the type of system which can be used but other systems can also be employed depending upon the size and the nature of the installation.

It should be evident that various modifications of the system described can be made without departing from the scope of the present invention.

I claim as my invention:

1. A method for burning raw materials in the production of clinker from cement raw materials which comprises:
   drying and partially deacidifying cement raw materials in lumpy form to produce granules while transporting them in contact with hot gases,
   passing another portion of said cement raw materials in the form of finely divided meal into a suspension type heat exchanger to heat the same,
   deacidifying the resulting meal more completely in a calciner,
   mixing the thus treated granules and deacidified meal, and
   treating the resulting mixture in a thermal reactor to complete deacidification and the formation of clinker.

2. A method according to claim 1 in which said resulting mixture contains granules having an average degree of deacidification of between 0% and 60% and meal having a degree of deacidification between 30% and 95%.

3. A method according to claim 1 in which said resulting mixture contains granules having a temperature between 300° C. and 700° C. and meal having a temperature between 700° and 980° C.

4. A method according to claim 1 in which:
   said granules are partly deacidified by subjecting them to additional thermal energy before said granules are passed into said thermal reactor.

5. A method according to claim 1 in which:
   fuel is added to said resulting mixture at the time it enters said thermal reactor.

6. A method according to claim 5 in which:
   said fuel is added in the form of lumps.

7. An apparatus for burning raw materials in the production of clinker from cement raw materials comprising:
   means defining a traveling grate,
   means for introducing hot gases through said grate to heat raw materials disposed thereon,
   means defining a sintering kiln following said traveling grate and receiving the discharge from said grate,
   a cooler following said sintering kiln and receiving the discharge from said sintering kiln,
   a suspension type heat exchanger,
   means for introducing raw meal into said heat exchanger,
   a calciner following said heat exchanger and including additional firing means receiving the heated meal from said heat exchanger,
   said heat exchanger being arranged in parallel with said traveling grate with respect to raw material flow into said sintering kiln.

8. A system according to claim 7 which includes:
   a tertiary air line connected in parallel to said sintering kiln and extending from said cooler to said calciner.

9. A system according to claim 8 which includes:
   a branch line branching off from said tertiary air conduit and discharging into said traveling grate.

10. A system according to claim 7 which includes:
    an auxiliary burner positioned to heat the material being conveyed on said traveling grate.

* * * * *